(12) United States Patent
Sim-Tang

(10) Patent No.: US 9,021,309 B2
(45) Date of Patent: Apr. 28, 2015

(54) METHOD AND SYSTEM FOR CREATING VIRTUAL EDITABLE DATA OBJECTS BY USING A READ-ONLY DATA SET AS BASELINE

(71) Applicant: Instavia Software, Inc., Saratoga, CA (US)

(72) Inventor: Siew Yong Sim-Tang, Saratoga, CA (US)

( * ) Notice: Subject to any disclaimer, the term of this patent is extended or adjusted under 35 U.S.C. 154(b) by 0 days.

(21) Appl. No.: 13/941,739

(22) Filed: Jul. 15, 2013

(65) Prior Publication Data

US 2014/0143283 A1 May 22, 2014

Related U.S. Application Data

(63) Continuation of application No. 13/010,030, filed on Jan. 20, 2011, now Pat. No. 8,489,930.

(60) Provisional application No. 61/296,572, filed on Jan. 20, 2010.

(51) Int. Cl.
*G06F 17/30* (2006.01)
*G06F 11/36* (2006.01)

(52) U.S. Cl.
CPC ...... *G06F 17/30292* (2013.01); *G06F 11/3664* (2013.01)

(58) Field of Classification Search
CPC .......... G06F 11/3664; G06F 17/30566; G06F 17/30572; G06F 17/30575; G06F 11/1469; G06F 11/2097
USPC ........................................................ 714/1–57
See application file for complete search history.

(56) References Cited

U.S. PATENT DOCUMENTS

| 6,901,409 B2* | 5/2005 | Dessloch et al. ...................... 1/1 |
| 7,370,165 B2* | 5/2008 | Meharchand et al. ........ 711/163 |
| 8,489,930 B1* | 7/2013 | Sim-Tang .................... 714/38.1 |
| 2004/0039727 A1* | 2/2004 | Dessloch et al. .................. 707/1 |

* cited by examiner

*Primary Examiner* — Nadeem Iqbal
(74) *Attorney, Agent, or Firm* — David H. Judson

(57) ABSTRACT

A method is integrated into the local operating system of a test machine. The disclosed technique preferably uses a master copy of one or more data objects from a first location to create virtual data objects (e.g., files or folders) that appear to be part of a file system mounted to a test machine in a second location. This disclosure describes a "projection" method and computer program that enables access to a destination object at a target location immediately upon initiation of a copy command at a source location while a copy operation is carried out in a background manner.

11 Claims, 11 Drawing Sheets

A test or duplicate application environment using storage snapshot cloning technology

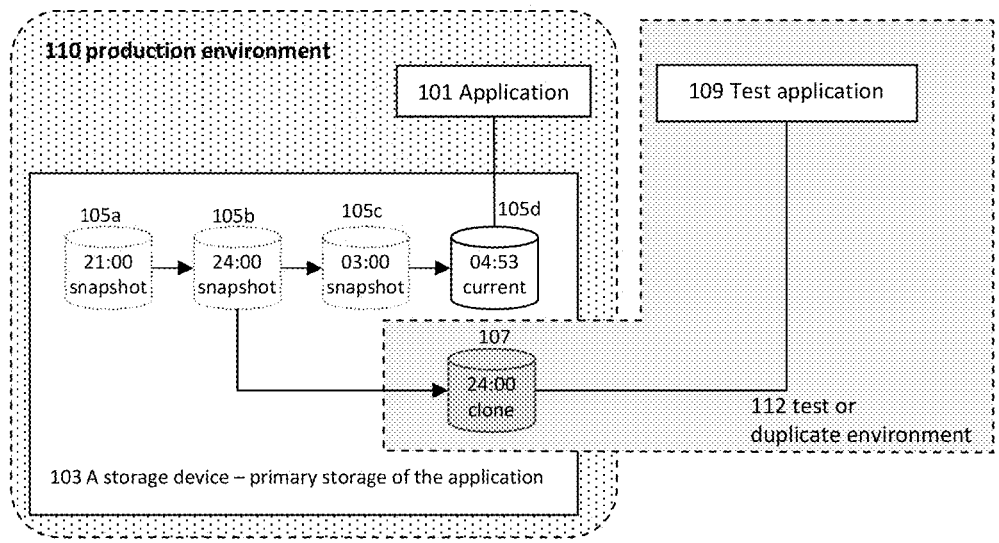
Figure 1: A test or duplicate application environment using storage snapshot cloning technology
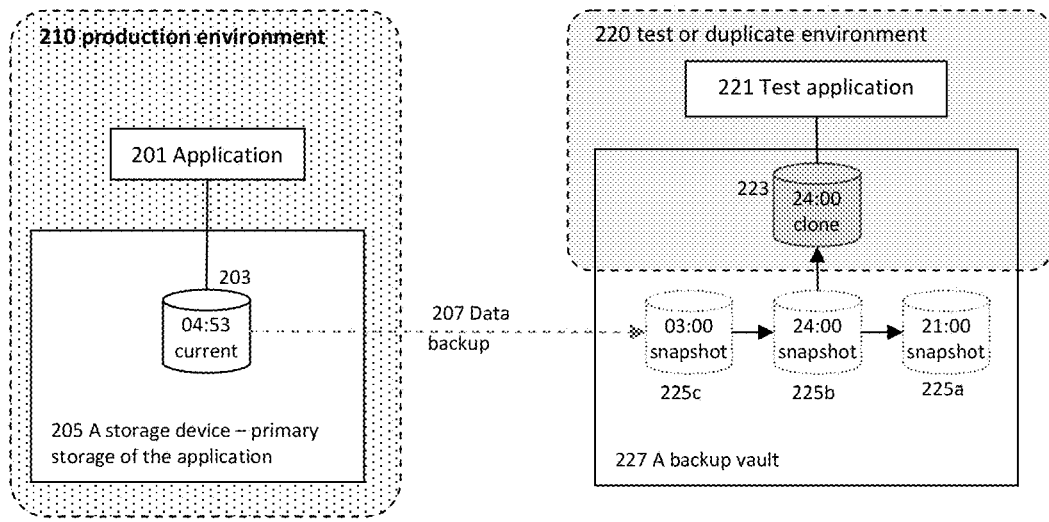
Figure 2: A test environment using an exported snapshot clone from a backup vault

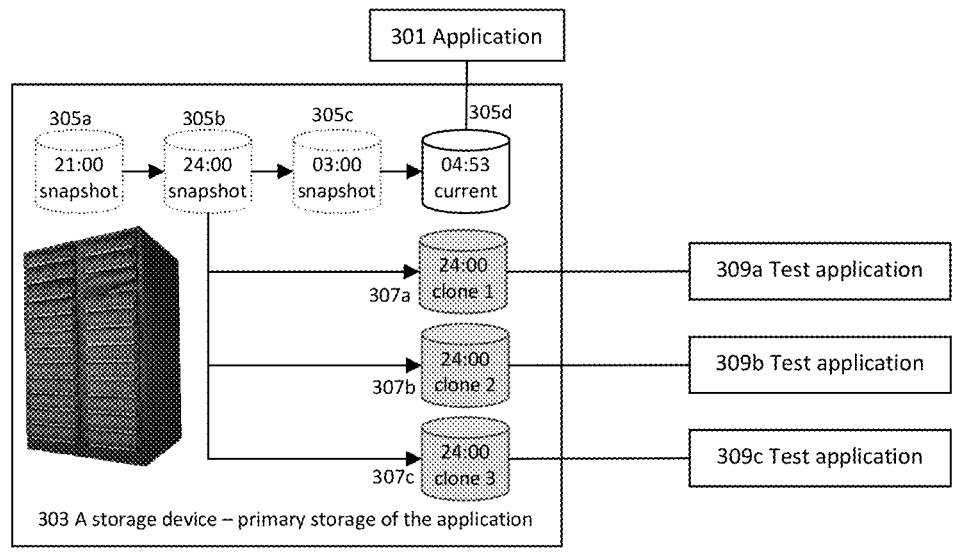
Figure 3: Multiple test environments using storage snapshot cloning
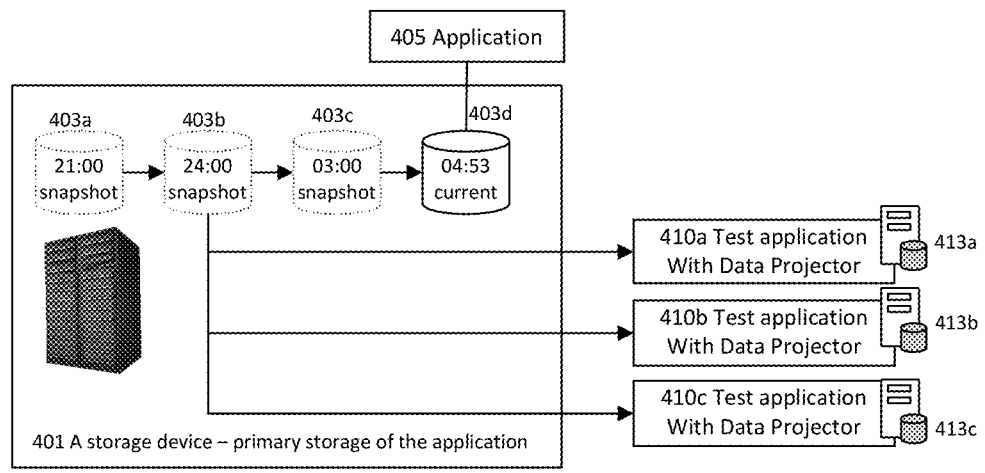
Figure 4: Multiple test environments using the current invention –
the Data Projection technology

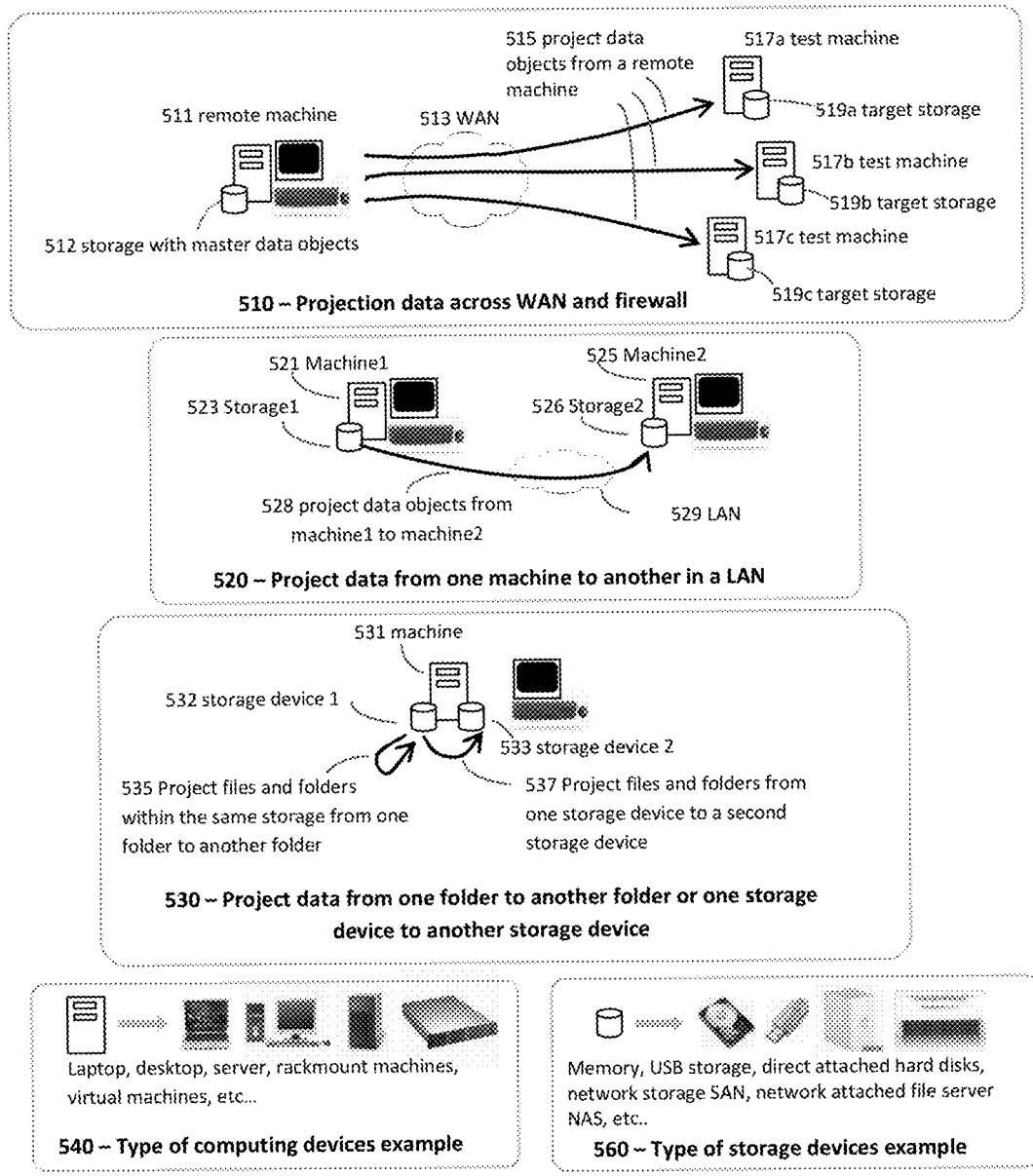
Figure 5: Sample Data Projection scenarios

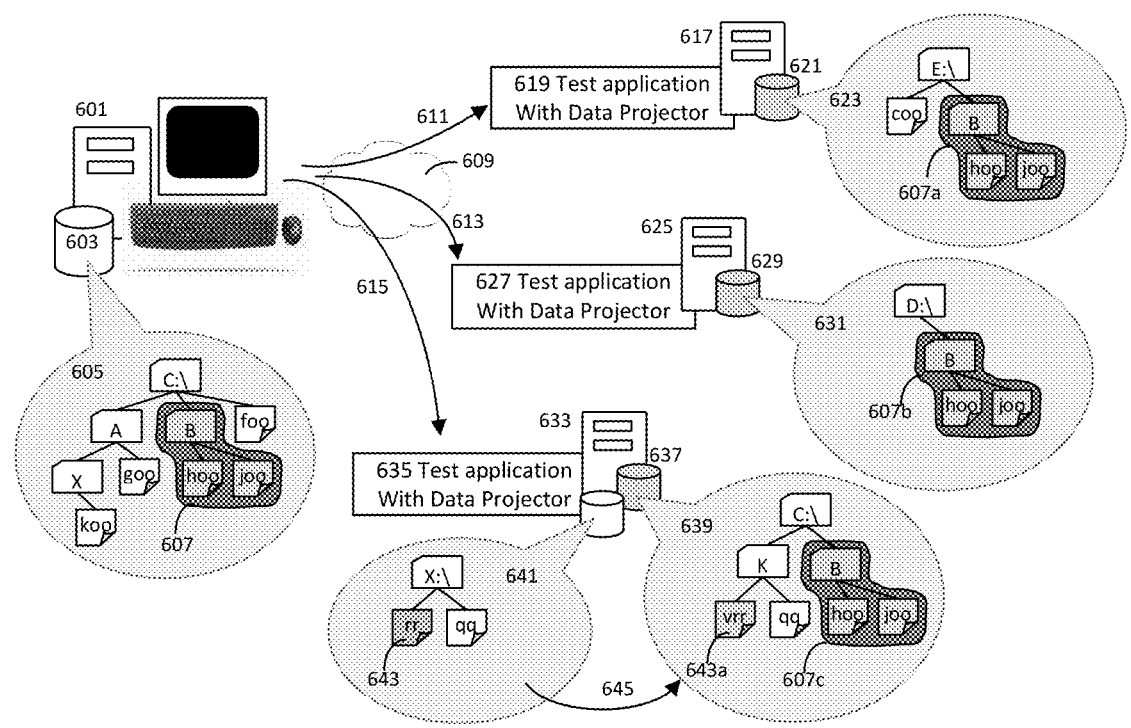
Figure 6: Using Data Projector to project granular data objects from one location to multiple locations

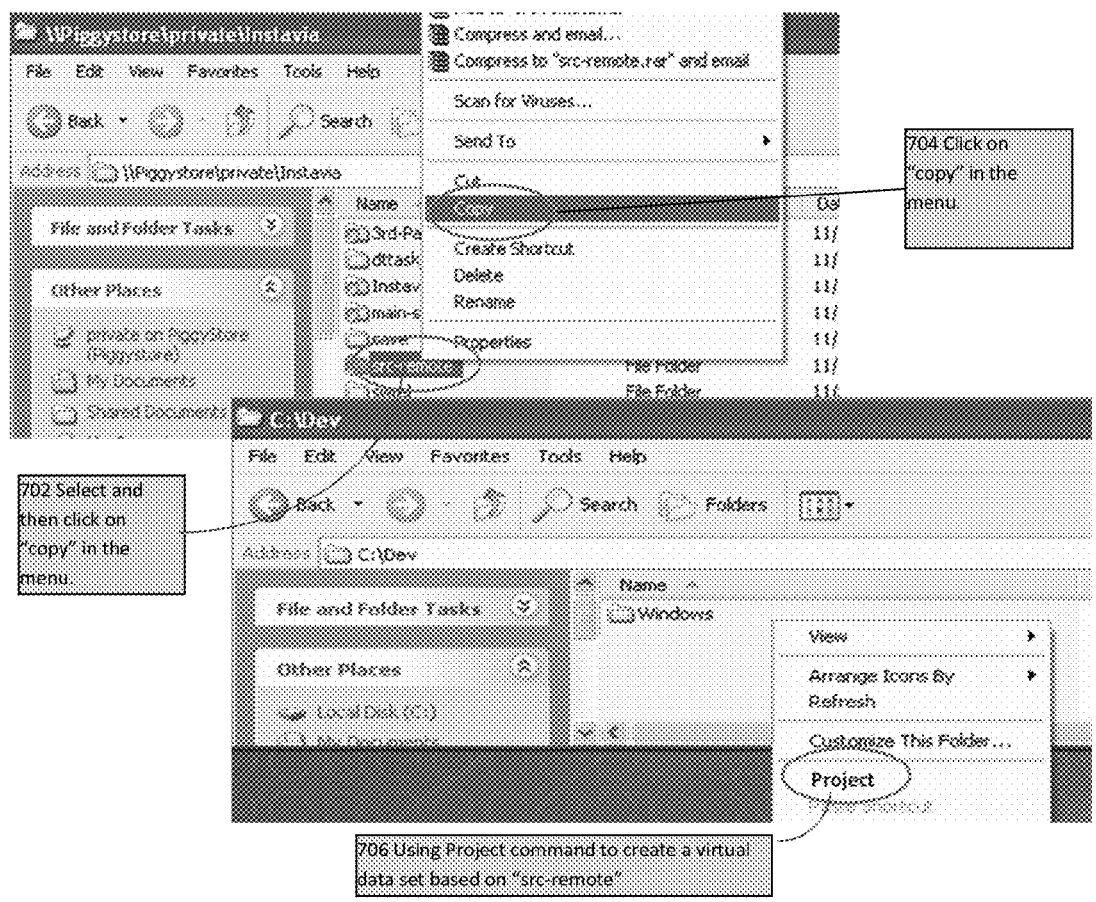
Figure 7: Initiating a data projection operation using Directory Explorer
(select-copy-and-project user action)

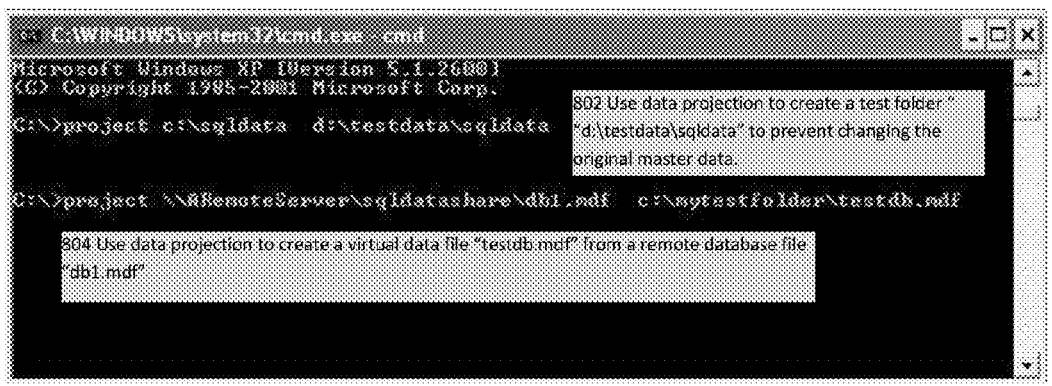
Figure 8: Initiating a data projection operation using a command shell
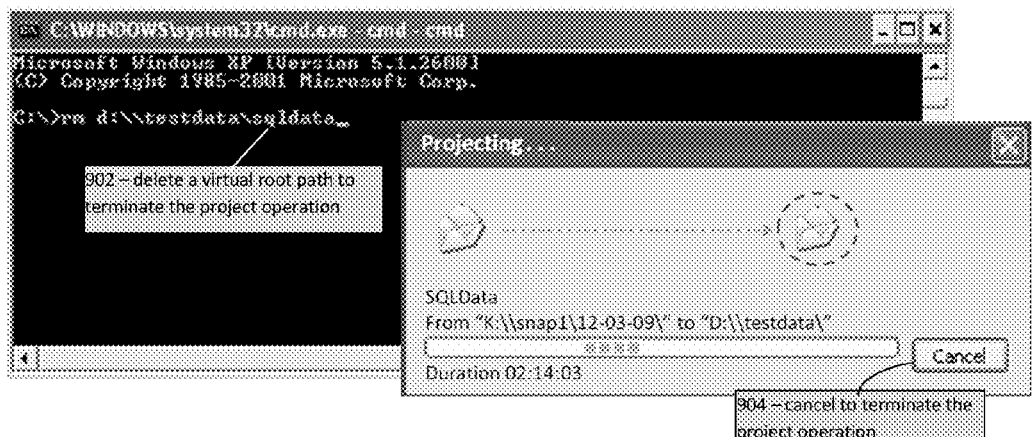
Figure 9: Two ways to terminate a project operation

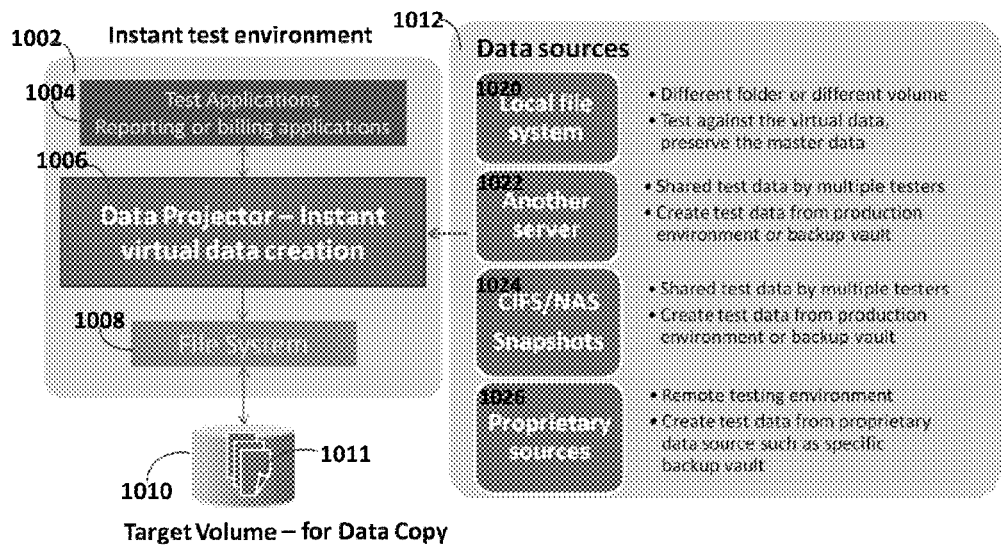
Figure 10: A representative Data Projector architecture in a more general fashion
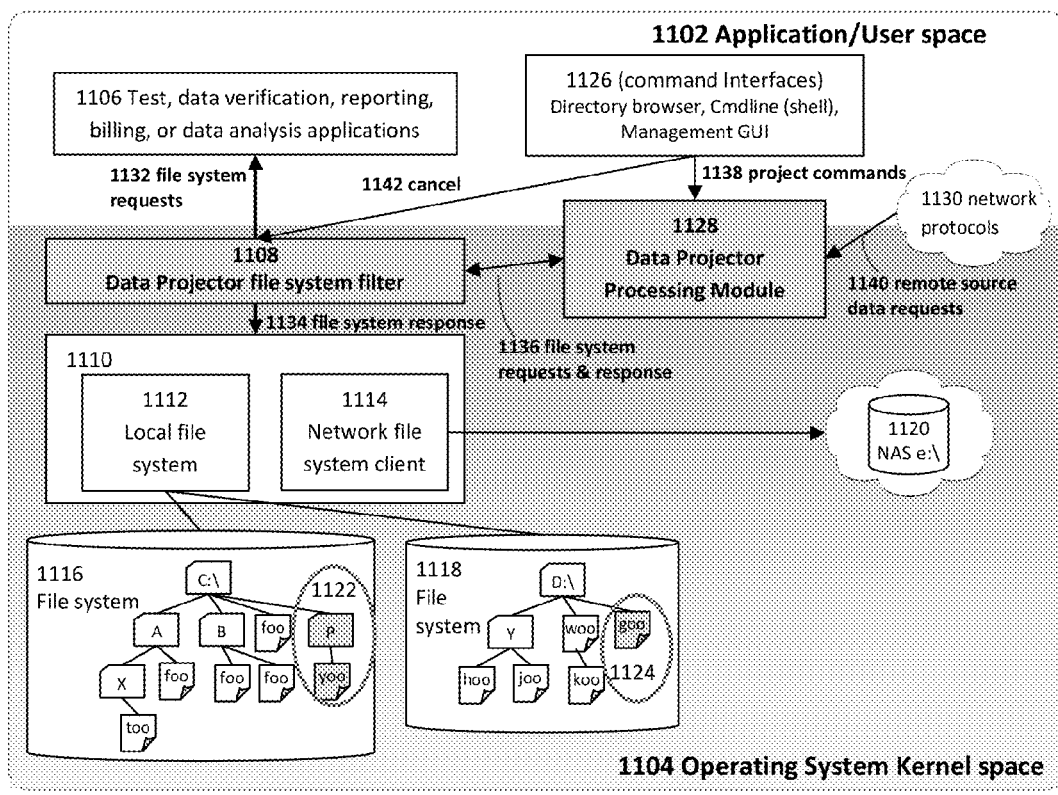
Figure 11: Representative computing environment with an integrated Data Projector

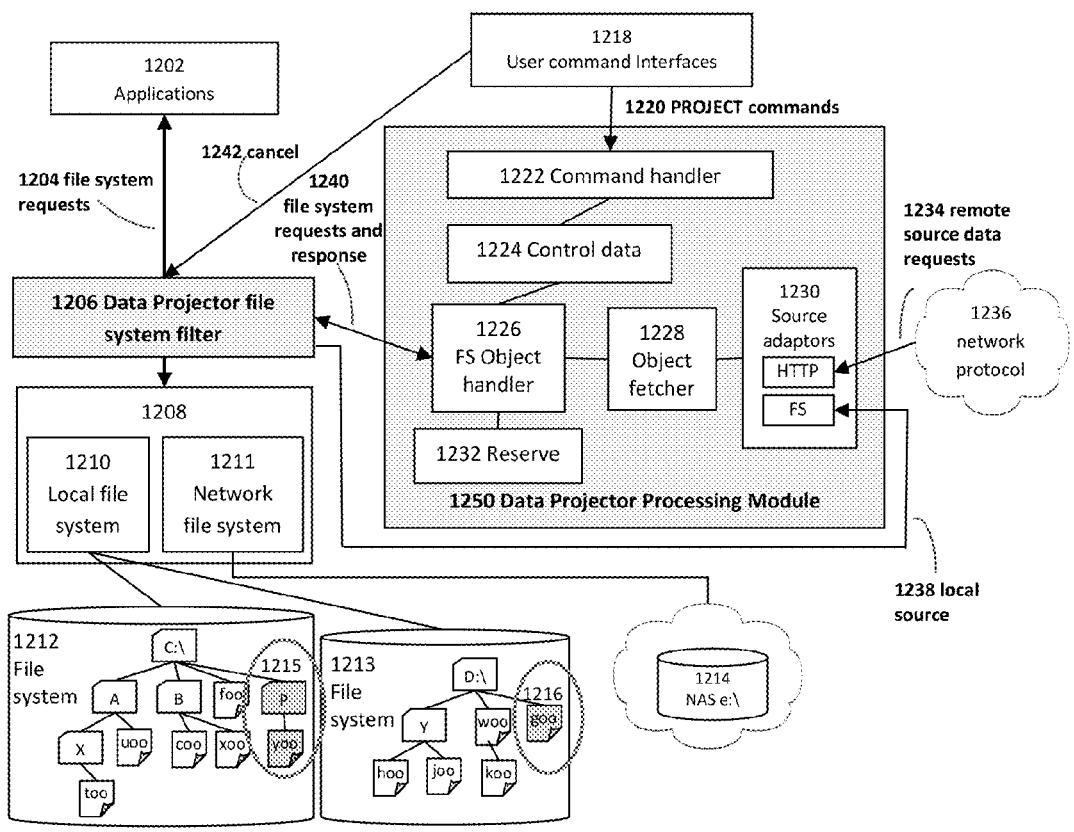
Figure 12: A preferred embodiment of a Data Projector

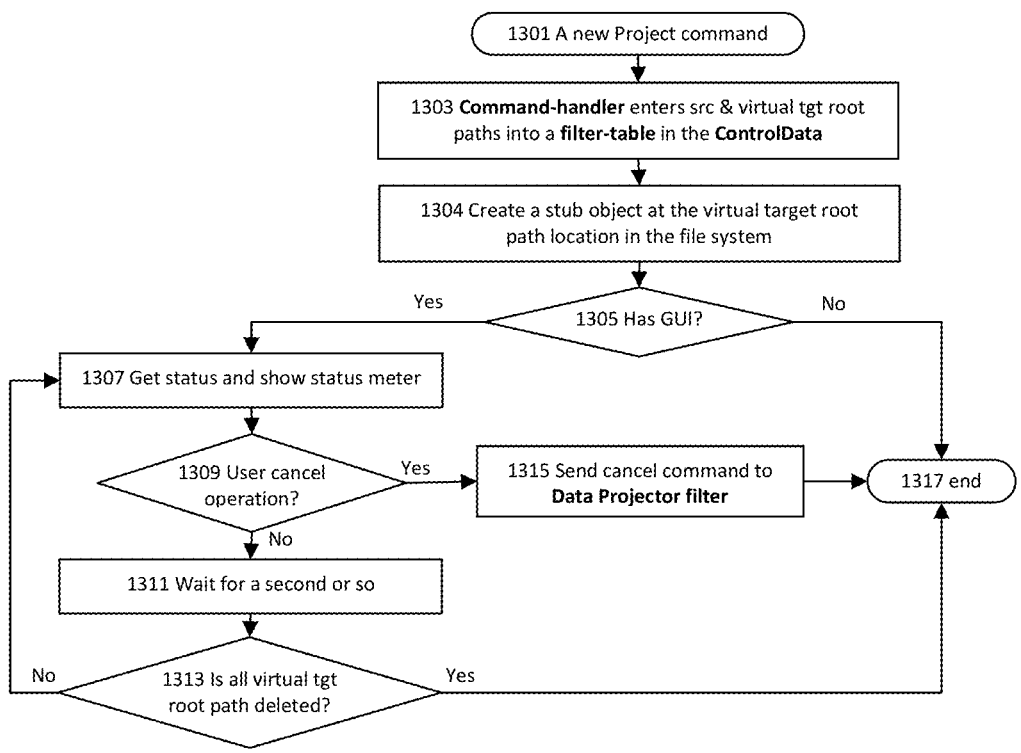
Figure 13: The initiation of a PROJECT command in the preferred embodiment

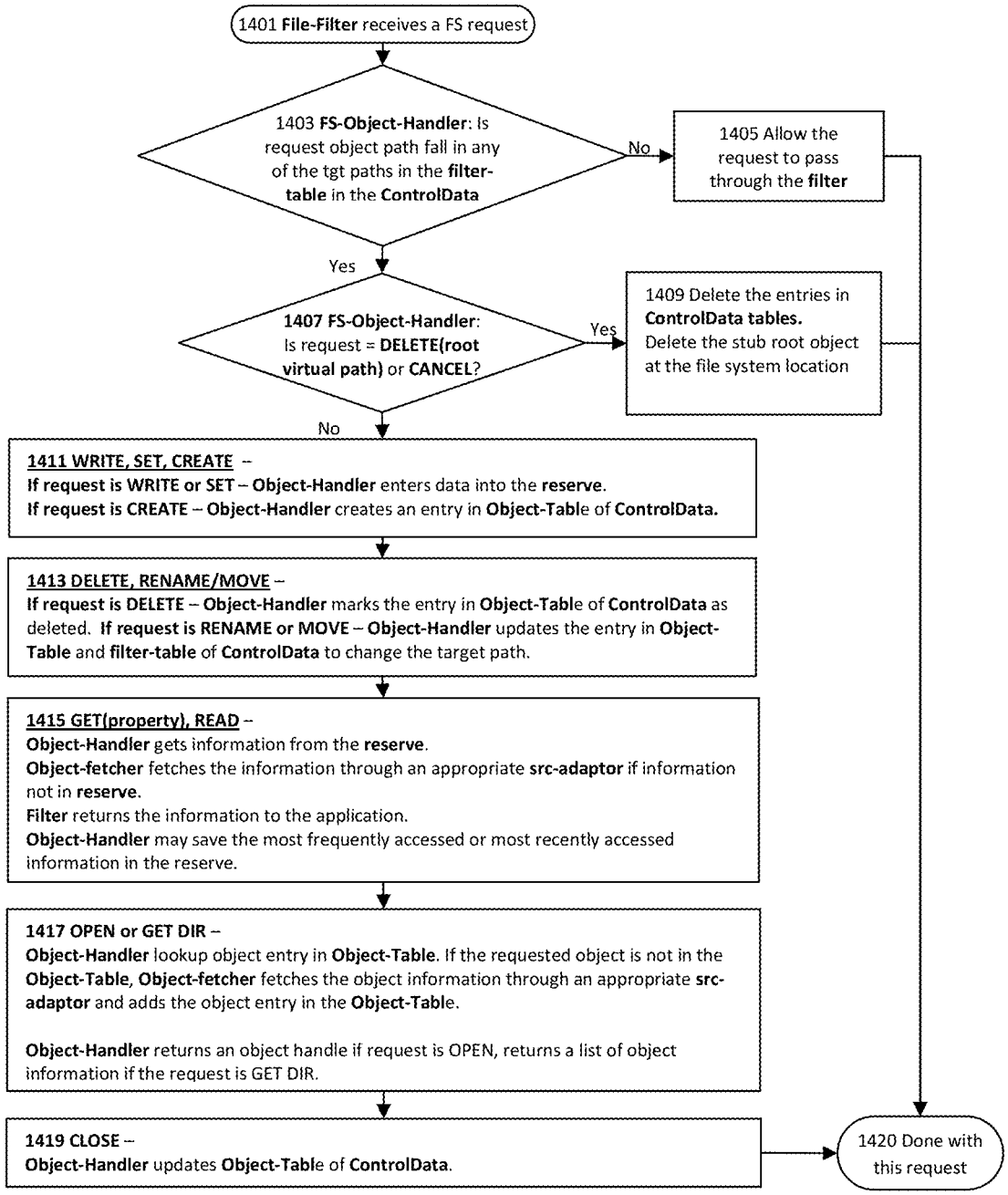
Figure 14: A flowchart of the handling of a file system request with Data Projection in the preferred embodiment

1224 Control Data

1502 Filter Table:

| | 1504 Project OP ID | 1506 Source Root | 1508 Virtual Target Root | 1510 Other Info |
|---|---|---|---|---|
| 1512 | 17262927 | \\1.2.3.4\snap10-31-09\bin\ | C:\P\ | User security info, etc... |
| 1514 | 17262927 | \\1.2.3.4\snap10-31-09\log\ | C:\K\ | User security info, etc... |
| 1516 | 82768374 | C:\A\x\too | D:\goo | User security info, etc... |

1530 Object Table:

| | 1532 Object context ID | 1534 Object type | 1536 Source path | 1538 target path | 1540 status | 1542 metadata reference | 1544 content reference | 1545 other info – parent reference, open handle, user security info, etc... |
|---|---|---|---|---|---|---|---|---|
| 1550 | 01 | File | C:\A\x\too | D:\goo | Opened | Ref to reserve | Ref to reserve | |
| 1552 | 02 | Folder | \\1.2.3.4\snap10-31-09\bin\ | C:\P\ | Opened | Ref to reserve | | |
| 1554 | 03 | File | \\1.2.3.4\snap10-31-09\bin\db1.mdf | C:\P\db1-test.mdf | Opened, renamed | Ref to reserve | Ref to reserve | |
| 1556 | 04 | Folder | \\1.2.3.4\snap10-31-09\log\ | C:\K\ | Closed | Ref to reserve | | |
| 1558 | 05 | File | \\1.2.3.4\snap10-31-09\log\db1.log | C:\K\db1.log | Deleted | | | |

Figure 15: An example of the Control-Data in the Data Projector Processing Module of current embodiment

METHOD AND SYSTEM FOR CREATING VIRTUAL EDITABLE DATA OBJECTS BY USING A READ-ONLY DATA SET AS BASELINE

BACKGROUND

1. Technical Field

This disclosure relates generally to using a real data set to create 1) a test environment for performing tests; and/or 2) a duplicate application environment for generating reports, billing statements, data analysis, and the like.

2. Background of the Related Art

It is a common and good practice for developers, performance analysis engineers, and quality assurance (QA) engineers to test their product using real life data before handing the product to their customers. Applications that may require testing against a large and real life data set include, without limitation, database applications and storage management software. To perform realistic functional and operational tests, an engineering organization assigns to its developers and testers some amount of storage and server hardware to create test environments that are similar to a production environment. A large and real life data set for testing can be created by restoring data from backup tapes, copying from a snapshot, or copying from a saved master data set into a test environment. Test data can also be generated by an application-specific data generation tool. Once a very large data set is created or obtained, it is a good practice to safeguard it. A saved data set may be compressed to save storage space. A well-managed QA organization typically also ensures that a good master copy of test data does not get overwritten by test software. Given that a master copy of test data should be preserved, a QA engineer typically has to make a copy of it to create a test environment. In this case, if there are 10 QA engineers, there needs to be 10 times the extra storage to permit the creation of 10 testing environments for running all the tests in parallel.

Testing with real life data is also an important part of an IT process before an administrator rolls out a new deployment, updates production application software, or upgrades an IT environment. Creating a test environment and generating a test data set can be very time consuming and costly. IT administrators often have to perform these tasks during off time-periods, or to postpone new rollouts or system upgrades while they are being performed.

There are other scenarios in which production data is desired to be used, e.g., data analysis, data mining, and auditing.

To overcome the known challenges, some vendors have developed data cloning technology to make a clone for a test environment from a read-only snapshot. FIG. 1 illustrates how a point-in-time read-only snapshot is cloned to make a read-writable copy. FIG. 2 illustrates a snapshot clone taken from a backup vault. FIG. 3 illustrates multiple test environments using storage snapshot cloning technology. This latter case necessitates the creation of three snapshot clones (307a, 307b, and 307c) for the three test applications (309a, 309b, and 309c). These technologies are usually extended features of a storage device or a storage archive solution.

BRIEF SUMMARY

A method is integrated into the local operating system of a test machine. The disclosed technique preferably uses a master copy of one or more data objects from a first location to create virtual data objects (e.g., files or folders) that appear to be part of a file system mounted to a test machine in a second location. The first and second locations can be different folders in the same storage volume in the same machine; in the alternative, they can be in different volumes, in different machines, or in different networks.

For discussion purposes, the process of creating a copy of a virtual data object using a master copy of a source data object as described herein is sometimes referred to as "Data Projection." The source data objects that can be projected can be of any type or form. The data object types include, without limitation, files, folders, or any specific structured object, such as photo album or the like. For example, according to the technique described herein, a source folder at a first location, such as \\aRemoteMachine\sqldata\, is projected to the C volume of a test machine in a second location as "c:\testdata\sqldata\". The folder "c:\testdata\sqldata\" is a virtual folder that appears as if it is a local physical folder in the C volume. The following description focuses only on files and folders as data objects, although this is not a limitation.

In this document, the preferred embodiment of the data projection method is encapsulated in a Data Projector.

Once projected, destination/target virtual files and folders can be accessed immediately regardless of their size. The disclosed technique allows applications to open the virtual files or folders, and to obtain and set the object properties and attributes. The technique also allows the target virtual files to be read and modified, new virtual sub-folders or files to be created, and existing virtual files and folders to be deleted, moved, or renamed.

Preferably, the virtual files and folders are projected from a real master data set into a destination file system folder in the test machine. As changes are made to the metadata and content, those changes are saved into a "reserve" at the projected host (the test environment). The reserve can be one or multiple file container(s) in a local file system. The modifications do not affect the master data; therefore, the master data can be a read-only data source. Preferably, metadata or content are fetched as they are being accessed, either from the reserve, or from the master data set if the requested information is not present in the reserve. A set of files or folders can be projected to a test environment for access within seconds.

In an illustrative embodiment, the data projection method herein utilizes a file system filter that integrates into the local operation system of a test or duplicate machine to intercept all (or substantially all, or given ones of) the file system requests. In the embodiment, a processing module works with the file system filter to process file system requests. A data projection operation is initiated when the processing module receives a project command from a file system browser (such as Windows Explorer or Mac OS Finder), command line API (for example, any form of shell command), Web service API, a Graphical User Interface command, and the like. A project command allows at least one pair of source path and target path (e.g., source—c:\mydir\myfile.doc, target—d:\savehere\). A target path is a destination path where virtual files or folder objects should be projected. Preferably, target paths are registered in the control memory of the processing module. The processing module handles any random file system requests from users and applications for data inside the target paths. The processing module fetches file and folder information from the local reserve or the data source as users and applications request them. When users and applications manipulate the virtual objects—such as creating new objects, deleting existing objects, renaming objects, changing the attributes and properties of the objects, and/or changing the content of the virtual files—the changes are recorded in a local reserve in the test machine. For improved performance, part of the reserve can be used to save the most recently fetched information or frequently accessed information fetched from the source data objects. When a user cancels a particular projection operation, preferably the related virtual objects are deleted; users and test applications would not see any of the test objects once the projection is over.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

FIG. 1 illustrates a test or duplicate application environment using storage snapshot cloning technology;

FIG. 2 illustrates a test or duplicate application environment using an exported snapshot clone from a backup vault;

FIG. 3 illustrates multiple test environments using storage snapshot cloning technology;

FIG. 4 illustrates multiple test environments using the Data Projection technology of this disclosure;

FIG. 5 illustrates several sample data projection scenarios;

FIG. 6 illustrates the projection of granular data objects from one location to multiple locations using a representative Data Projector;

FIG. 7 illustrates an initiation of a data projection operation using Directory Explorer—with a select-copy-and-project user action;

FIG. 8 illustrates an initiation of a data projection operation using a command shell;

FIG. 9 illustrates two ways to terminate a data projection operation;

FIG. 10 illustrates Data Projector architecture in a more general fashion;

FIG. 11 illustrates a representative computing environment with an integrated Data Projector;

FIG. 12 is an embodiment of a Data Projector;

FIG. 13 is a flowchart showing the initiation of a Project command in one embodiment;

FIG. 14 is a flowchart showing the handling of a file system request with Data Projection in the embodiment; and FIG. 15 is an example of representative Control Data in the Data Projector Processing Module.

DETAILED DESCRIPTION

According to this disclosure, a master data set can be used to "project" to multiple test or duplicate environments. FIG. 4 shows an example of using data projection as contemplated herein to project a read-only snapshot (403b) into three test environments (410a, 410b, and 410c). In this case, the modifications are stored in a reserve area (or "reserve") in the local file system at the local storage of the test environments (413a, 413b, and 413c). There is no need to create a write-able clone in the primary storage because modifications from the test environments preferably are not written back to the primary storage. Indeed, in this approach there is no need to allow write-access to the primary storage (401) from the test environments (410a, 410b, 410c). The read-only access protects the primary data set from damage by malicious applications outside the production environment. This approach is unlike traditional methods that only allow an entire volume or an entire protected data source from a backup vault to be cloned for testing.

FIG. 5 presents several sample scenarios where Data Projection can be applied. In (510), the test machines (517a, 517b, and 517c) are installed with a Data Projector. The Data Projector at the test machines (517a-c) projects (515) the data objects from the storage (512) of a remote machine (511) through a wide-area network (513), possibly through a firewall, to the local target storage (519a-c). The projected data objects at the local target storage (519a-c) are virtual objects. Changes made in the test machines are saved in a reserve in the local storage (519a-c). In scenario (520), a Data Projector is installed in machine2 (525). Source data objects from the storage (523) of machine1 (521) are projected (528) to storage (526) of machine2 (525). In this example scenario, these two machines are in the same local area network (529). Scenario (530) shows two data projection operations; the source and target virtual objects of both operations are on the same machine (531). One operation projects (535) data objects from a first folder to a second folder, where both folders are in the same storage (532). The second operation (537) projects data objects from storage1 (532, e.g., c:\ volume) to storage2 (533, e.g., d:\ volume). These are practical scenarios for QA engineers to perform testing on a pre-release product, although this is not a limitation. By projecting a source data to a virtual target on the same machine, the test application does not modify the source data; instead, it modifies only the target virtual data. If the test application fails, it will only corrupt the virtual data, which is discarded as soon as the project operation is terminated. Preferably, no modification is made to the source data. Using this approach, QA engineers do not have to fix any data corruption or re-generate the test data.

The machines (540) shown in the examples can be a laptop, a desktop, a server, a rack-mount machine, a virtual machine, or any other computing devices, systems or sub-systems. The storage devices (560) can be any random access devices, such as, without limitation, direct attached hard disks (DAS), network storage (SAN or NAS), USB devices, memory, and more. One of ordinary skill will appreciate that the examples in FIG. 5 are for purposes of illustration and are not meant to be limiting.

FIG. 6 depicts granular object projections in more details. As shown in the example in FIG. 6, a folder B (607) is projected to multiple test environments (617, 625, and 633); a data projection allows granular data objects such as files and folders to be projected to a test environment. In particular, the master (i.e. source) data objects (607) in storage (603) of machine (601) are projected (611, 613, and 615) over the network (609) to the machines (617, 625, and 633) of the test environments (619, 627, and 635). The source data objects—folder B (607) and all its children objects (files hoo and joo) are projected from the file system (605) to the target machines. In test environment (619), folder B and its children (607) are projected as virtual objects (607a) in the file system (623) of volume E:\ (621); these virtual objects appear as if they are part of volume E:\. In test environment (627), folder B and its children (607) are projected as virtual objects (607b) in the file system (631) of volume D:\ (629); these virtual objects appear as if they are a physical part of volume D:\. In test environment (635), folder B and its children (607) are projected as virtual objects (607c) in the file system (639) of volume C:\ (637); these virtual objects appear as if they are a physical part of volume C:\. Also, the source file "rr" (643) in file system (641) of volume X:\ of machine (633) is projected (645) to volume C:\ (639) in the same machine; the projected virtual file is renamed to "yrr" (643a). This diagram shows that files and folders can be projected from one folder to another folder, one storage device to another storage device, and one machine to another machine, etc., and that the projected virtual objects appear as if they are located in the target file system.

FIG. 7 illustrates an initiation of a data projection operation using a native directory browser of the operating system. Microsoft Windows Explorer is shown in this example. In the screenshot diagram, a user selects a source folder, e.g., "src-remote" (702) through a directory browser; the source can be on a local storage or a remote file system. Then the user clicks "copy" on the command menu (704) to pick up the source folder (702), and then points into the destination browser window and clicks "Project" on the command menu (706). In this case, the "src-remote" folder is selected to project into the destination parent folder "C:\Dev\"; the destination path is "C:\Dev\src-remote\". This drawing shows that project command can be integrated into a directory browser of any OS platform (Mac OS Finder, Linux desktop application, cloud file system browser and the like). The source and target browsers can be of different kinds. For example, source objects from a cloud based file system displayed from an Internet browser can also be projected to a local file system displayed using a directory browser, and vice versa.

FIG. 8 illustrates the initiation of a project operation using a command shell. The first command (802) projects the source folder "c:\sqldata" into a virtual path "d:\testdata\sqldata". The directory "d:\testdata\" is real, but the "d:\testdata\sqldata" in the target is a virtual folder. The second command (804) projects the source file from a remote machine "\\ARemoteServer\sqldatashare\dbl.mdf" into a real folder as a virtual object "c:\mytestfolder\testdb.mdf". In this example, "dbl.mdf" is renamed to "testdb.mdf" as it is projected. The folder "c:\mytestfolder" is real but "testdb.mdf" is a virtual file. Commands can be created for any kind of command shell in any OS platform. Commands can be initiated locally at a test machine or through a network shell from a remote location. Also, a project command can be embedded in any script and program, which can then be launched by a user, by a schedule based trigger schedule, or by a specific system event. One example of the program that may include a data projection command is a system or application management software; the software may include a management GUI where data objects can be selected for projection. The data projection command can also be integrated into test applications to initiate a data project prior to the actual tests.

FIG. 9 demonstrates how a data projection operation can be terminated. Because virtual files and folders projected for testing or for generating reports and billing statements typically are for short term use, they can be discarded once they are no longer needed. To remove the virtual objects, users should terminate the associated data projection operation. In this embodiment, preferably there are two ways to terminate a data projection operation. One is to delete all the virtual objects associated with the operation. Another is to send a termination command to the Data Projector; a GUI can be provided for user to initiate the sending of the command. FIG. 9 presents the two examples. The first example shows the deletion of a virtual object (902—rm "d:\testdata\sqldata") using a command shell. If "d:\testdata\sqldata\" is a virtual root path of a project command, and that the specific command has no other virtual root path (note that each project command can have multiple pair of source and virtual target paths), the Data Projector would terminates the operation. Deletion of a virtual object can be done using a directory explorer or any other user interface that interacts with the file system.

The second example shows the cancellation of a project operation using a GUI. In this case, when a data projection operation is initiated, a status meter is displayed that indicates that a data projection is in action. A user can click on the "Cancel" button (904) to terminate the operation. When the "Cancel" button (904) is clicked, a termination request is sent to the Data Projector. This is just one GUI example for canceling the operation; other examples include but not limited to management dashboards, or test application user interface. A termination command can also be issued using a command shell and the command can also be included in scripts or programs.

FIG. 10 is a high level architecture drawing of a Data Projector, an embodiment of the data projection method. In this example, the test environment (1002) or a duplicate environment for generating reports or billing statement includes the application (1004), a file system (1008), a storage (1010) for storing the file system, and a Data Projector (1006). The Data Projector (1006) preferably inserts itself between the applications (1004) and the file system (1008) so that it can present one or more virtual objects (i.e. an object that does not physically reside in the file system 1008 and the storage 1010) to the applications. As applications (1004) modify the one or more virtual objects, the changes are saved in a reserve (1011) which can be made up of one or more files in the local storage, or a database that is connected to the local system. The projected source objects (1012) can be file system objects from a local file system (1020) in the same or on a different storage volume than the target volume (1010). The source objects can also be file system objects from a different server (1022), from a snapshot of a production data set in a network attached storage (NAS 1024), or from any proprietary data sources (1026) such as data from a backup vault. Changes made by the applications (1004) in this test or duplicate environment are only stored in the reserve (1011), preferably they are not written back to the source (1012); the source objects are read-only to the Data Projector. There are many reasons for projecting local file system objects (1020) into a different folder for testing. For example, a QA engineer may want to run a test regularly with the exact same data, by performing a projection, the source data does not get modified, this ensures identical data on each repeated new projection and test. Another reason is to prevent a test application from corrupting a test data. Projecting from remote source allows multiple testers or developers to share the same source data set. Also, it allows a snapshot of a production data set to be used for testing without having to copy the entire snapshot to the local storage. These are just some examples of data sources, other source objects not listed include, without limitation, remote objects from the Internet which can be accessed (for example) through HTTP protocol. The scenarios illustrated here are merely representative FIG. 11 shows the high level components of a computing environment with an integrated Data Projector. This is a test or duplicate environment where a source data is projected into for the testing or other processing. This diagram provides a breakdown of a Data Projector (1006) into two components—a file system filter (1108) and a processing module (1114). In this embodiment, project commands (1138) are initiated by users through interfaces such as directory browsers, command shells, or management GUI (1126). The Data Projector Processing Module (128) processes the project requests and enters the source and virtual target object locations in its memory. As soon as the virtual target root path (i.e. projected destination location) is entered into the memory, the virtual objects can be accessed immediately by the applications (1106) in this test or duplicate environment. For example, if users issued two project commands "project e:\masterdata\p\ c:\p\" and "project c:\A\X\too d:\goo" (note the command format is "project source target"), then two virtual target root paths would be projected—"c:\p\" (1122) and "d:\goo" (1124). The sub-objects (e.g., "c:\p\yoo") inside a virtual folder (e.g., 1122) are all virtual objects; the sub-objects are the children of a virtual root (e.g., "C:\P\"). The second command not only performs a projection, it projects the master object "too" into a virtual object that uses different name "goo". Note that a project command can have multiple source and target pairs. For example, a project command may be "project s1 t1 s2 d2", which means projects source "s1" to virtual target "t1" and source "s2" to virtual target "t2". Virtual objects (1122 and 1124) do not exist physically in the storage devices (1116 and 1118); they are presented to the application (1106) as if they are physically located in these storage devices. The file system requests (1132) from the applications to the file systems (1110) are intercepted by the Data Projector file system filter (1108). If the requests concern the virtual objects are intercepted, the requests (1136) are handled by the Data Projector Processing Module (1128), and the response (1136) from the Processing Module (1128) is sent back to the applications (1106). If the requests (1132) do not concern the virtual objects, they are forwarded to the file systems (1110).

There can be several types of file system, e.g., a local file system (1112) if the requests are for objects stored in the local storage, or a network file system (1114, e.g., CIFS file system client) if the requests are for objects stored in a network storage device (1120). The responses (1134) from the file system (1110) are sent back to the applications (1106). When the virtual objects, their properties, or their contents are requested, the Processing Module (1128) retrieves the information from a local reserve if the information is available; otherwise, the information is fetched from the source objects. The source objects may be in a different location in the local file system (1112), in which case, the Processing Module (1128) would fetch the information through the filter (1108). If the source objects are in a network storage device (1120), the Processing Module (1128) fetches the information again through the filter (1108) from the network file system (1114). If the source objects reside in another machine or network that are not accessible using any file system interface, then the Processing Module (1128) fetches (1140) the information using some specific network or application protocol (1130).

If the applications (1106) modify the virtual objects, such as renaming the objects, deleting the objects, relocating the objects, changing the object properties, and/or changing file contents, preferably the changes are kept in a reserve. The reserve is where the Processing Module (1128) tries to retrieve information for file system requests before attempting to fetch the information from the source object. The reserve can be a repository that made up of one or multiple files, it may have folders with files and sub-folders, and it can be in any of the storage devices accessible to the test machine. The reserve can also be a database that is accessible by the Data Projector. Also, part of the reserve may be used to store information other then modifications; for instance, it can be used to store frequently accessed data or the most recently fetched data for improving fetch performance.

Once execution of the applications (1106) is completed and the virtual objects no longer needed, the project operation should be terminated and the reserve for the virtual objects should be freed. When a projection operation is terminated, preferably all its associated virtual objects disappear. Cancellation of an operation can be from the applications (1106) or from a command interface (1126). A project operation is terminated when the virtual target root objects of the operation are deleted (via a file system DELETE command—1132, also see FIG. 9) or when a cancellation command (1142, see FIG. 9) is received by the filter (1108). Alternatively, the cancellation command (1142) can be sent to the Processing Module (1128).

In a traditional operating system, the file systems (1112 and 1114) are functioning in the kernel space (1104) which has strict rules in terms of resource utilization. A function failure in the kernel space may result in the failure of the entire system. Almost all applications and services (1106 and 1126) are functioning in a user space (1102) where each application has its own process boundary to contain its resources. In user space, an application failure in general does not affect another application. In addition, in a traditional operating system environment, there are more resources and tools that an application (1106 or 1126) can use in the user space (1102). In user space (1102) a function failure within an application (1106 or 1126) does not affect the operating system. A file filter (1108) typically has to be implemented in the kernel space (1104), whereas the Data Projector Processing Module (1128) can be implemented either entirely in the kernel (1104), entirely in the user space (1102), or it can be a hybrid implementation where some of its functions are implemented in user space (1102) and other functions are implemented in the kernel space (1104) with the filter (1108). There is performance and design complexity trade-off on each approach, and the choice of the implementation may also depend on the operating environment.

FIG. 12 provides a more detailed view of the above embodiment. This diagram provides a representative component breakdown within the Data Projector Processing Module (1250, which is also 1128 of FIG. 11). This diagram does not specify which components in the Processing Module (1250) are in user space and which are in kernel space because the decision is a choice of implementation. The decision may in some cases depend on the operating system environment. In one implementation, the components in the Processing Module (1250) may further break down into more sub-components; in another implementation, the components may be broken down into different fashion. For example, the Object-Handler (1226) and Object-Fetcher (1228) may be one component. In some situation, the component break down may depend on the operating environment. Also, the components and control data in the Data Transporter Processing Module may breakdown and group into parts, e.g., with one-half running in kernel mode and the other half running in user mode. For example, the Object-Handler (1126) and the Control Data (1224) may each be divided into two sub-components. In yet another embodiment, some or all of the sub-components may be moved into the file filter (1206).

FIG. 13 illustrates the process when a Data Projection command is initiated. A new Data Projection command (1301 FIG. 13, or 1220 FIG. 12) can be issued via a command shell, a directory browser, or any management GUI (1218). In step (1303), the project command (1220) is sent to the Command Handler (1222), which creates one or more entries in the Filter-Table (1502) in the Control Data (1224). A pair of source and virtual target path occupies an entry in the Filter-Table (1502). If a project command has multiple pair of source to target paths, there would be multiple entries in the table. For example, the project operation (17262927) has two entries (1512 and 1514), one entry indicates that "\\1.2.3.4\snap10-31-09\bin\" is projected to "C:\P\", another entry indicates that "\\1.2.3.4\snap10-31-09\log\" is projected to "C:\K\". The operation ID in column (1504) may be a generated unique number or a hash key. In step (1304), the Command Handler (1222) creates a stub root object at each of the target root path location. Based on the above example, two stub (i.e. empty) folders "C:\P\" and "C:\K\" are created.

From this point on, the virtual objects are available for access by the applications or users (1202).

The handling of file system requests flow diagram in FIG. 14 illustrates how the virtual objects may be accessed (e.g., READ or WRITE). Step (1305) checks the operating environment to find out if it is necessary to display a status meter. If there is no need to display a status meter (i.e. if there is no GUI display), the operation is initiated and there is nothing else to do (1317) other then processing the file system requests in FIG. 14. In case there is a GUI, the process move on to step (1307). At step (1307), a status meter is displayed. The status meter may be displayed by the same GUI application that initiated the command or by a management application. The status is provided by the Command Handler (1222) of the Processing Module (1250). In step (1309), feedback from the status meter is checked to find out if a user has canceled the project operation. If so, a "cancel" command (1242) is sent to the Data Projector file system filter (1206); otherwise, the management application keeps waiting (1311) and looping back to (1307) until the operation is terminated. In step (1313), the management application checks if the virtual target root object(s) of this operation are deleted, if so, it means that all the virtual objects of this operation are deleted/removed by the test application or users and that the operation should have been terminated. At this point, the operation is automatically terminated, and there is no need to show the status meter (1313 to 1317).

Once the virtual root paths are entered into the Filter-Table (1502) in the Control Data (1224) by the Command Handler (1222) in step (1303) of FIG. 13, the user can access the virtual objects through the file system interface (1204) immediately. In FIG. 14, when a file system request (1204) is issued by the application (1202) and intercepted by the Data Projector file system filter (1206) in step (1401), the request is forwarded (1240) to the Data Projector Processing Module (1250). In step (1403), the Object Handler (1226) of the Processing Module examines the requested file system object path to find out if the requested object is a virtual object. It does so by comparing the requested object path with the target root paths (column 1508, FIG. 15) in the Filter-Table (1502, FIG. 15) of the Control Data (1224, FIG. 12). If the requested object falls in any of the target virtual paths in column (1508, FIG. 15), the test in step (1403) is affirmative (i.e. the requested object is a virtual object) and the process move on to step (1407). For example, if requested object path= "c:\A\X\B\dir-x\myfile.doc", and if there exists a target virtual root path="c:\A\X\M" in the Filter-Table (1502, FIG. 15) column (1508), then the requested object is a virtual object. Note that more information regarding the tables in the Control Data (1224, FIG. 12) will be discussed in a later section.

Also, new Filter-Table (1502, FIG. 15) entries can be added when a virtual object inside a virtual target root path is moved out of the virtual target root path into another physical location. This is necessary for tracking the virtual root objects that are planted on a physical folder. By keeping track of all root virtual objects, step (1403) would not miss any of the virtual objects when processing file system requests. If the file system request is for a non-virtual object (i.e. a physical object, an object that is not part of the projected objects), then there is no need for the Data Projector to do anything, the process move to step (1405) where the Data Projector filter (1206) lets the request to go through to one of the file systems (1208). If the requested object is a virtual object, step (1407) examines the request to find out if the request has anything to do with cancellation of the operation. If the request is a CANCELLATION request to terminate the data projection, the test in step (1407) is affirmative. The process goes on to step (1409) to delete all the virtual target root entries in both the Filter-Table (102) and Object-Table (1530) that are related to the operation. If the request is a DELETE request to delete a virtual root path (i.e. a path in column 1508 of Filter-Table 1502, FIG. 15), then it is also related to cancellation, the process also moves to step (1409). In step (1409), if the request is a DELETION of a virtual root path, the specific row of entry in the Filter-Table (1502) and all the virtual objects associated with the virtual target root are removed. The handling of the file system request is completed (1420) following step (1409).

Note that, in this embodiment, a data projection operation can be terminated by deleting all the target virtual root paths of that operation. If the test at step (1407) is negative (i.e. the request has nothing to do with cancellation of the operation), the process moves on to step (1411). Note that from this point on, it is known that the file system request is targeting a virtual object and also the request is not about cancellation. At step (1411), the Object-Handler (1226) makes sure an entry is created in the Object-Table (1530) in the Control Data (1224) for the requested virtual object. If the request is a WRITE (writing new content to a virtual file), at step (1411) the Object-Handler (1226) writes the content into a reserve (1232) and updates the content reference column (1544, FIG. 15) of the particular virtual file entry in the Object-Table (1530). The content reference column (1544) of a file object entry contains reference to the new content of the virtual file in the reserve (1232). If the request is a SET (setting the attributes or properties on a virtual file or a folder—also known as setting the metadata), at step (1411) the Object-Handler (1226) writes the metadata into a reserve (1232) and updates the metadata reference column (1542) of the particular virtual object entry in the Object-Table (1530). The metadata reference column (1542) of a virtual object entry contains the reference to the metadata of the virtual object in the reserve (1232). If the request is a CREATE (creating a new virtual object inside an existing virtual folder), the Object-Handler (1226) at step (1411) creates a new entry for the new virtual object in the Object-Table (1530) of the Control Data (1224). The status of this new object entry is marked as "created" because this virtual object is created at the test environment, it does not exist in the source. If the file system request is a DELETE (deleting a virtual object, that is not a root object), the Object-Handler (1226) in step (1413) marks the status column (1540) of the specific virtual object as deleted. If the deleted virtual object is a folder, then the status of all its children objects are also marked as deleted. To have an efficient search for all the virtual children of a folder, the Object-Table (1530) can add a parent reference column where each object can save the reference to their virtual folder (i.e. parent). In this way, all the child entries of a particular folder can be located by finding a match on the parent column.

The Object-Table (1530) can also include indices to facilitate search. If the file system request is a RENAME or MOVE (changing the name or path of a virtual object—note that a MOVE request is usually same as RENAME in a typical file system), the Object-Handler (1226) in step (1413) changes the target path column (1538) of the particular virtual object in the Object-Table (1530). In case column (1538) saves the full object path, a RENAME/MOVE of a virtual folder results in changes to all its children's target path in column (1538). Again, for better performance, a parent index or parent column can be added for looking up children objects and updating their target path very quickly. An alternate solution is not to keep full path in column (1538), instead keep only a parent reference and a relative path.

The example in FIG. 15 column (1542) shows the full virtual target path to make it easier to explain the implementation even though typically it is not efficient (or necessary) to keep full path for each object. In step (1413), the Object-Handler (1226) also adds "renamed" to the status column (1538) to reflect that the virtual object is relocated or renamed. In step (1413), if a virtual object is moved out of its virtual root path (i.e. moved out of a virtual parent that is specified in the Filter-Table 1502), into a physical parent, a new entry in the Filter-Table (1502) is created for this particular object. Also, a new root stub object is created inside the new physical folder. This means that this virtual object is now a virtual root object because its new parent is a physical object. This ensures that as virtual objects are moved out from a virtual root into a new physical location, they will continue to be handled correctly by the Data Projector. If a virtual root object is renamed or moved, Object-Handler at step (1413) also updates the virtual target root (column 1508) of the associate virtual root object in the Filter-Table (1502). If the request is a GET (getting the attributes or properties of a virtual file or folder object), the Object-Handler (1226) in step (1415) lookup the Object-Table (1530) for the entry of the requested virtual object; it follows the metadata reference (column 1542) of the virtual object to retrieve the requested information from the reserve (1232). If the requested information is not in the reserve (1232), the Object-Fetcher (1228) fetches the information from the source object through an appropriate source adaptor (1230). The source path (1536) is used to access the source object. A FS (i.e. file system) adaptor is used if the source object can be retrieved through one of the file system (1208)—that is if the source object is either located physically in the local storage devices (1212 or 1213) or located physically in a network storage device (1214) or a network computer that provides its file shares to the other machines. Preferably, an HTTP adapter is used if the source is over the Internet. These adapters (1230) are just illustrative, not limiting.

If the request is a READ (reading the content of a virtual file), the Object-Handler (1226), in step (1415) the Object-Handler (1226) lookup the Object-Table (1530) for the entry of the requested virtual object; it follows the content reference (column 1544) of the virtual file object to retrieve the requested content from the reserve (1232). If the requested content is not in the reserve (1232), the Object-Fetcher (1228) fetches the content from the source file through an appropriate adapter (1230). The requested information is passed through the Data Projector filter (1206) to the requesting application (1202). The Object-Handler (1226) may choose to save the most recently accessed information or the most frequently accessed information in the reserve (1232) to improve access performance. If fetched information is saved in the reserve (1232), the associated metadata reference (1540 FIG. 15) or content reference (1542 FIG. 15) of the object entry in the Object-Table (1530) is also updated. If the request (1204) is an OPEN (opening a virtual file or folder), in step (1417) the Object-Handler (1226) lookup the Object-Table (1530) for the object entry. An object can only be opened if it is not "deleted" (status column 1540 has the indicator). If the virtual object is not deleted and its entry existed in the Object-Table (1530), an object open handle (a hash number or the address to the Object-Table entry) is returned to the requesting application (1202) through the Data Projector filter (1206). The Object-Handler (1226) marks the object status (1540) "opened" in the Object-Table (1530). If there is no entry for the object, it means that the object has not been fetched yet, in which case the Object-Fetcher (1228) fetches the necessary object information from the source object through an appropriate adapter (1230). The Object-Fetcher (1228) uses the source path (1536) of the parent of the requested object to find the source object. For example, if the application (1202) requests to OPEN "C:\P\myfile.doc", the Object-Fetcher (1228) locates the object entry of "C:\P\" in the Object-Table (1530), appends the object name "myfile.doc" to the parent's source path (1538 and 1552) (i.e. \\1.2.3.4\snap10-31-09\bin\myfile.doc) to find the actual source object.

An object entry (row) is added to the Object-Table (1530) for the requested virtual object once it is fetched, and an object open handle is returned to the requesting application (1202), and the object status (1540) is marked "opened". In case the request is a GET DIR (getting the children/folder listing of a virtual folder), in step (1417), the Object-Handler (1226) retrieves all the non-deleted children of the target virtual folder from the Object-Table (1530), and the Object-Fetcher (1228) fetches all the children of the source folder through an appropriate source adapter (1230). The Object-Handler (1226) merges the two lists and removes the deleted virtual objects (i.e. the objects which status 1540 in the Object-Table 1530 is marked as "deleted"). The requested metadata of the list of objects are also retrieved from the reserve (1232) or from the source objects, and the information is returned to the requesting application (1202) through the Data Projector filter (1206). If the request is a CLOSE (closing a virtual object), in step (1419), the Object-Handler (1226) removes the "opened" indicator of the object status (1540) of the particular virtual object entry in the Object-Table (1530). Similar to a real object, the Object-Handler (1226) ensures that virtual objects are not deleted if they are opened by an application.

The flowchart in FIG. 14 is a simplified process for handling of a file system request for a virtual file system object. The handling of the request types are grouped in steps (1411) to (1419). The handlings of the requests that are similar are grouped into one step in this flowchart. For example, WRITE (change content of a file), SET (change attributes or properties), and CREATE (add a sub-object to a folder) requests make modification to some content of a virtual object; the handling of these requests are grouped into step (1411). Also, DELETE, RENAME, and MOVE, are requests that manipulate the existence of an object; the handling of these requests are grouped into step (1413). As any developer would know, the order of the steps in FIG. 14 can be easily changed, for example, one can switch the order of (1411), (1413), (1415), (1417), and (1419). One can also switch the order of (1403) and (1407). One can group the requests in a different fashion. Once can also have a flowchart that does not group the requests, but instead shows clearly the process for each request. The flow diagram simply shows one possible implementation.

FIG. 15 is an example of representative Control Data (1224 FIG. 12) of the Data Projector Processing Module (1250). This is used as a data structure for saving the contexts and states of the virtual objects and the data projection operations. In this preferred embodiment, the processes in FIG. 13 and FIG. 14 rely on the Control Data (1224) to track the project operations.

The Filter-Table (1502) contains information about the projection operations that are in action. Column (1504) is the project operation ID; each project operation has its own ID which is uniquely created for tracking the operation. Column (1506) is a source path of the operation; it shows the location of the source root object. Column (1508) is a target virtual root path; it shows the location where the source object root is projected to. Column (1510) contains all the other information which may include user security information (of the user who initiated the operation) and the other options and parameters of the operation. Preferably, there is one entry in the Filter-Table (1502) for each source root and virtual target root pair. A project command may have one or multiple source and target pairs. Therefore, a project operation may have multiple entries in the Filter-Table (1502). For example, a project command may be "project s1 t1, s2 t2", which means source root s1 is projected to virtual target root t1, and source root s2 to virtual target root t2. In this case, there would be two entries for the one project operation. Rows (1512 and 1514) are examples where one operation has two pairs of source and target root paths. In step (1403) in FIG. 14, the Object-Handler uses the Filter-Table (1502) to find out if a requested object is a virtual object by comparing the requested object path to the virtual target root paths (1508) in the Filter-Table (1502). If the requested object is outside of all the virtual target root paths (1508), then the requested object is not a virtual object. Objects on the virtual root path, or inside the virtual root path, are virtual objects. In this situation, when a virtual file or a virtual folder inside a virtual target root path is moved out of the virtual target root path into a physical folder, a new entry is added to this Filter-Table. The moved virtual object becomes a new virtual root object after it is moved. This way, the process (1403) in FIG. 14 does not miss any virtual object. The Filter-Table (1502) in FIG. 15 is just a sample; in a different embodiment, this table may be split into multiple tables, and more information may be saved. Also, this information may be stored in memory, in a file, or in a database.

The Object-Table (1530) preferably contains information about the virtual objects in used or has been used. If a virtual object is not in the Object-Table (1530) it means that the virtual object has not been modified or accessed. Once a virtual object is accessed by an application (1202), an entry for the object is created in the Object-Table (1530). If a virtual object is not modified (none of its content, attributes, properties, or name is changed, and it is not deleted), once it is CLOSED by the application, it can be removed from the Object-Table (1530) to keep the size of the table small. Column (1532) provides an object context ID for easy access to the table; it can be a hash key, the memory address, a sequence number, or any unique identifier for the object. Column (1534) shows the object type—in this example, it can be a file or a folder. Column (1536) shows the source object path (the location of the source object); this is where the object metadata and content can be fetched. Column (1538) is the current virtual target path, the location where the object is projected to; users can move or rename virtual objects in the file system, therefore, this virtual target path can change. Column (1540) shows the status of the virtual object. If a virtual object is "opened" and being used by an application, its status is opened. The status of a virtual object can be a combination of "deleted", "renamed", "opened", "created", etc. . . . that makes sense. An object cannot be "opened" if it is "deleted." Column (1542) is the metadata reference to the virtual object reserve (1232) location where the metadata of the virtual object is stored. The reserve (1232) may not have all the metadata of a virtual object; when an application (1202) requests for metadata of a virtual object, and if the metadata is not presented in the reserve (1232) the Object-Fetcher (1228) will attempt to retrieve the information from the source object. Column (1544) contains the content reference to the virtual object reserve (1232) location where some portions of the content (mostly modified data) of a virtual file is kept. The reserve (1232) most likely does not have the full content of a virtual file; when the missing content is requested, the Object-Fetcher (1228) reads the data from the source object. Column (1545) represents other information, not shown in this example, but could be very useful to the implementation. The other information could include a parent reference of a virtual object, the open handle(s) of the virtual object (handles that are given to the applications that open the virtual file or folder), the security information of the user who opens the object, and other parameters. The parent reference can be a combination of a hash key of the virtual parent folder path, a hash key of the parent folder's source path, or the address to the table entry of the parent object.

The information in the Filter-Table (1502) and Object-Table (1530) are merely representative; in a different embodiment, more information may be needed in these tables, or these tables may be split into more tables. In addition, the project operation ID (1504) and the Object Context ID (1532) may be a hash key of its source or virtual target data paths, or they can simply be any unique ID. The source root paths (1506), virtual target root paths (1508), source object paths (1536), virtual target object path (1538), and operation or object information each may also have a hash key for optimizing searching of the objects during the handling of the file system requests. The information provided in FIG. 15 is just illustrative and non-limiting. These tables can reside partly or entirely in memory, files, file systems, or a database. There can also be indices of its information to facilitate searching for the entry of a virtual object.

The virtual object reserve (1232) can be in one or more databases residing in memory or in one or more storage devices, it can be a set of files that make up a repository, or it can also be a directory of folders and files. For example, a reserve can be a directory of change files, and each change file contains the modifications of each virtual file or each virtual folder. Further, the change file may be a sparse file. The reserve (1232) contains the modified metadata and file content, and it may also include the most frequently accessed or most recently accessed information from the source objects. A reserve (1232) can be structure or none structure data container and repository, the above mentioned approaches are simply illustrative.

The technique has many advantages over traditional methods:

The Data Projector keeps modified data at the test machine where the modifications are made and saves the master data for reading only; this allows one copy of master data to be shared by multiple test environments as shown in FIG. 4. There is no need for IT administrators to create write-able clones for each test environment. Also, there is no need to estimate the storage quota for each test environment at the source storage device. This completely eliminates the need for centralized storage management. The tester at each test environment can terminate the data projection operation when the test data are no longer needed, at which point the captured modifications would be discarded and the virtual objects would disappear. The storage required for capturing the modification data on a test or duplicate environment depends on the type of applications run on that given environment. For instance, test applications typically use more storage than reporting or billing applications. If the test application performs mostly writes, and the test time is long, a large amount of storage at the test environment would be needed. The owner of the test or duplicate environment prepares the necessary storage based on his/her needs. The described approach eliminates the need for a large storage reserve at the central source storage device, thus making the solution much more scalable.

As noted above, the Data Projector at each test environment keeps the modified data at the test environment instead of writing back to the source. This prevents the write traffic from entering the source storage. Read traffic on the source storage is also reduced, this is because the Data Projector does not have to fetch data from the source once the applications have access to the virtual data already in the reserve of the test environment. The Data Projector at each test environment can also cache the previously read data or most frequently read data to cut down even more on read traffic to the master data. By reducing load at the source storage, performance impact is greatly reduced, thereby improving performance of the production application and all test applications that use the same master data set.

Because the Data Projector need not write back to the source data, there is no extra storage need at the source storage device. By using a Data Projector, the test environment owner plans for the storage his/her test application requires. If one test environment exceeds the storage set aside for it, the other test environments would not be affected. Also, the test and duplicate environments can use storage devices that are cheaper than the primary storage. Storage resource utilization in this case is much more efficient than that of the traditional methods, and the reliability of the production and test environments is improved as well, as the test environments are isolated from the production environment.

Because the Data Projector preferably need not write back to the production storage, IT administrators can restrict all write-access from the test and duplicate environments. This ensures that no application outside the production environment can modify and damage the production data.

Instead of accessing the source storage directly as in the snapshot cloning technique, the test environments that use Data Projector preferably access the source (master) data indirectly through their Projector. The Data Projector can use many different network protocols to access remote data, including, but not limited to HTTP. This allows the test environments to use remote data from different networks, even to use data outside of their firewall.

Although the processes described are shown as independent and distinct, this is not a limitation of the disclosed subject matter. One or more of the functions therein (or the overall systems themselves) may be integrated to facilitate the disclosed invention. In one embodiment, the functions are implemented in a computer program product in a computer readable medium, the computer program product holding computer program instructions that when executed by one or more data processors perform the beam method. Preferably, the processing herein is carried out with at least one of the processing steps being performed in a computer so as to implement a machine-implemented method. Typically, the computer is a "special purpose" or "particular" machine.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While given components of the system have been described separately, one of ordinary skill in the art will appreciate that some of the functions may be combined or shared in given instructions, program sequences, code portions, and the like.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. The above-described method also may be implemented as a managed or hosted service (e.g., in an ASP model) or a Web service. More generally, the beam service is provided by an operator using a set of one or more computing-related entities (systems, machines, processes, programs, libraries, functions, or the like) that together facilitate or provide the inventive functionality described above.

A representative machine on which the invention is implemented is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described my invention, what is claimed follows in the accompanying claim set.

The invention claimed is:

1. Apparatus, comprising:
a processor;
computer memory holding computer program instructions, the computer program instructions comprising:
program code to project one or more source data objects into a set of one or more virtual data objects that appear as if they are located in a target system;
program code operative as the projecting is on-going to enable immediate access, by an application, to the one or more virtual data objects;
program code to save a modification associated with a virtual data object without propagating the modification to an associated source data object; and
program code to destroy at least one of the virtual data objects upon an occurrence.

2. The apparatus as described in claim 1 wherein the modification is saved in a data reserve.

3. The apparatus as described in claim 2 wherein the computer program instructions further include program code to save in the data reserve most recently fetched information or frequently accessed information fetched from the source data objects.

4. The apparatus as described in claim 2 wherein the modification results from one of: creating a new object, deleting an existing object, renaming an object, changing an attribute or property of an object, and changing content of a virtual file.

5. The apparatus as described in claim 1 wherein program code projects the one or more data source objects in response to receipt of a projection command.

6. The apparatus as described in claim 1 wherein the occurrence is receipt of a completion command.

7. The apparatus as described in claim 1 wherein the source data objects are associated with the application, and wherein modifications to the source data objects are applied against the one or more virtual data objects in lieu of the source data objects.

8. The apparatus as described in claim 1 wherein the application is located at a first location and the target system is located at a second location.

9. The apparatus as described in claim 8 wherein the second location is remote from the first location.

10. The apparatus as described in claim 8 wherein the first and second locations are co-located.

11. The apparatus as described in claim 1 wherein the source data objects and the virtual data objects are co-located or located remotely from one another.

* * * * *